United States Patent [19]
Gruber et al.

[11] Patent Number: 5,566,162
[45] Date of Patent: Oct. 15, 1996

[54] METHOD OF SECTIONALIZING TROUBLE ON TELECOMMUNICATION NETWORK CONNECTIONS

[75] Inventors: John G. Gruber, Orleans; Gregory P. Burdett, Richmond, both of Canada

[73] Assignee: Northern Telecom Limited, Montreal, Canada

[21] Appl. No.: 568,724

[22] Filed: Dec. 7, 1995

[51] Int. Cl.$^6$ ........................................ H04J 3/14
[52] U.S. Cl. ........................ 370/13; 370/17; 370/14; 379/26
[58] Field of Search ............................. 370/13, 13.1, 14, 370/17, 85.13, 110.1; 371/3; 375/224; 379/1, 14, 21, 22, 26; 395/183.01

[56] References Cited

U.S. PATENT DOCUMENTS

| | | | |
|---|---|---|---|
| 4,424,479 | 1/1984 | Brown | 379/26 |
| 5,010,544 | 4/1991 | Chang et al. | 370/13.1 |
| 5,309,448 | 5/1994 | Bouloutas et al. | 370/13 |
| 5,337,306 | 8/1994 | Hall | 370/13 |
| 5,422,929 | 6/1995 | Hurst et al. | 370/13 |
| 5,450,394 | 9/1995 | Gruber et al. | 370/17 |

*Primary Examiner*—Hassan Kizou
*Attorney, Agent, or Firm*—Yoshiharu Toyooka

[57] ABSTRACT

In telecommunications involving more than one network, it is important to determine the location of a fault which may occur on a connection so that the responsible network administrator can be identified and appropriate remedial measures can be promptly performed. The invention allows sectionalization of trouble on a connection which spans more than one network administrative domain. It uses NE (near-end), FE (far-end) and Int. (intermediate) monitoring signals specific to separate layered entities associated with the connection.

6 Claims, 5 Drawing Sheets

METHOD OF SECTIONALIZING TROUBLE ON TELECOMMUNICATION NETWORK CONNECTIONS

FIELD OF THE INVENTION

The invention relates generally to the management of telecommunication networks. In particular, it is directed to a method of sectionalizing one or more troubles on telecommunication network connections which may span two or three network administrative domains.

BACKGROUND OF THE INVENTION

Telecommunications connections generally span more than one network administrative domain and involve more than one hierarchical layer. When a fault or trouble is detected, it is important to isolate the domain in which the fault has occurred so that remedial actions can be taken promptly. When a connection involves different network administrations, it is critical to determine responsibility for repair, etc. Connections are continuously monitored by nodes exchanging specially designed monitoring signals among them. Monitoring functions can take the following modes: Near-End (NE), Far-End (FE) and Intermediate (Int.) monitoring, which will be described in detail below. Today, some long distance carriers use proprietary enhancements of known monitoring techniques to sectionalize trouble. There are no standard techniques which are accepted industry wide for sectionalizing trouble among networks.

The invention resides in the trouble sectionalization process which uses well accepted NE, FE and Int. functions which are largely standardized or in the public domain. U.S. Pat. No. 5,450,394, issued Sep. 12, 1995 (Gruber et al) describes in detail NE, FE and Int. monitoring functions in connection with ATM, Frame Relay, packet switched networks etc.

The process of the invention can sectionalize trouble on connections in hierarchical or layered telecommunication networks that use NE, FE and Int. monitoring functions. Examples are PDH (pleisiochronous digital hierarchy), SDH (synchronous digital hierarchy) and ATM networks, and certain interworking combinations of such networks.

OBJECTS OF THE INVENTION

It is therefore an object of the invention to provide a method of sectionalizing trouble on telecommunication network connections.

It is another object of the invention to provide a method of sectionalizing trouble on telecommunication network connections from a single monitoring site on the connection.

It is a further object of the invention to provide a method of sectionalizing trouble on telecommunication network connections in which the connection spans two or three administrative domains.

It is yet another object of the invention to provide a method of sectionalizing trouble on telecommunication network connections using different path monitoring signals for different connection entities.

It is still another object of the invention to provide a method of sectionalizing trouble on telecommunication network connections in which the method is performed on demand or on a pre-set periodic basis.

SUMMARY OF THE INVENTION

Briefly stated, the invention resides in a telecommunication system consisting of a plurality of separately layered networks and/or hierarchically separate networks. According to one aspect of the invention, a method of sectionalizing trouble on a connection spanning two or three administrative domains within the layered or hierarchically separate networks comprises steps of conducting FE monitoring for trouble in two directions along the connection at a site located on the connection but adjacent to the boundary of two administrative domains, and conducting at the same site NE monitoring for trouble in the two directions along the connection. The method further includes steps of, at the same site, conducting NE and FE monitoring for trouble in the domain in which the site is located, and sectionalizing trouble in any of the administrative domains.

DETAILED DESCRIPTION OF PREFERRED EMBODIMENTS OF THE INVENTION

Trouble is defined as the presence of anomalies (e.g., transmission errors), defects (e.g., reframes) or failures (alarm conditions) on a network connection. The trouble sectionalization process according to the invention determines:

end-to-end (service level) trouble;

the direction(s) of the trouble; and in which of up to 3 administrative domains (carriers) the trouble originates.

Figure 1:
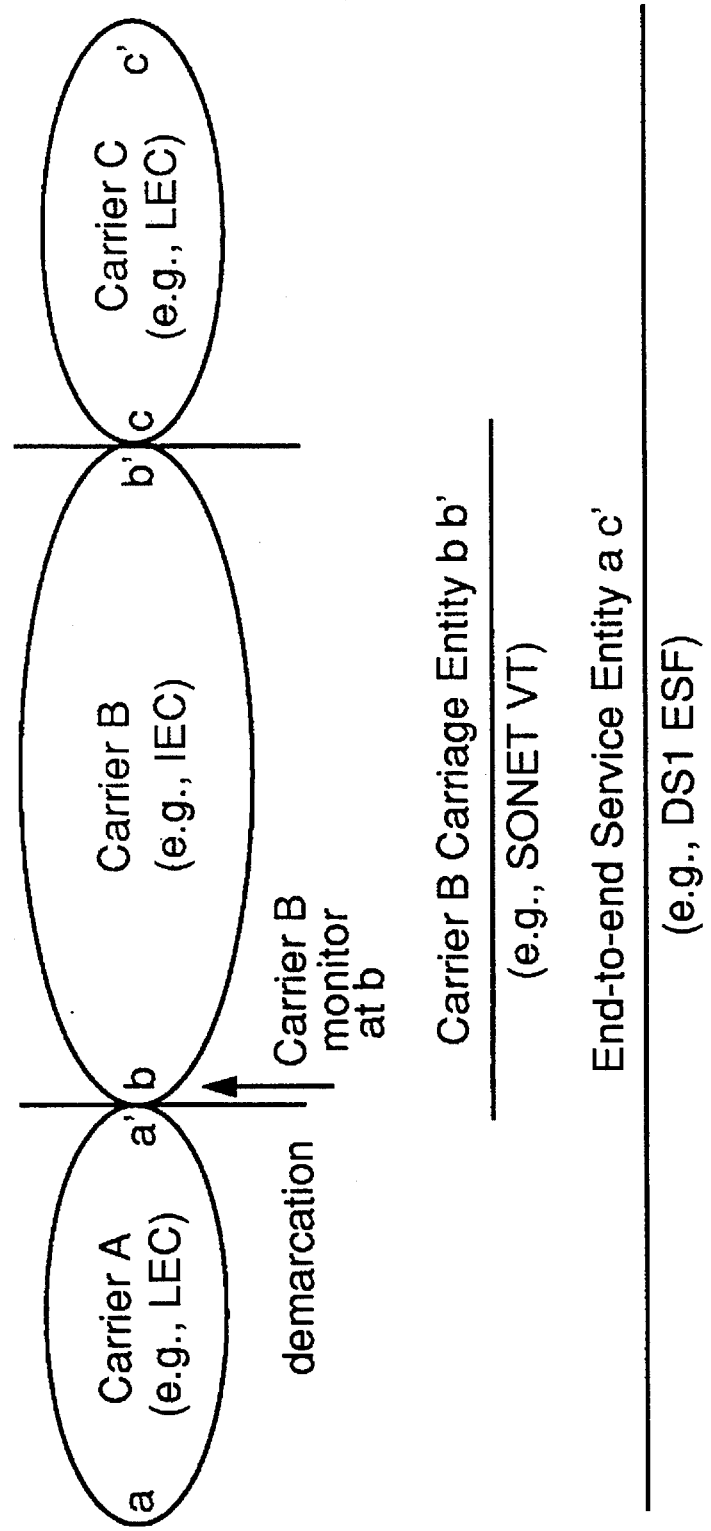
FIG. 1 illustrates a telecommunication connection involving three administrative domains according to one embodiment of the invention.

FIG. 1 illustrates a typical network connection which involves three administrative domains, A, B and C, with some demarcations. For example, in the USA, A= an LEC (local exchange carrier), B= an IEC (inter-exchange carrier), and C= another LEC.

Since the IEC is responsible for providing end-to-end service and for coordinating with the LECs for this purpose, the operation of the invention is described from the standpoint of the IEC (carrier B), is based on monitoring of an end-to-end service entity spanning carriers A, B and C, and on monitoring of a carriage entity spanning only carrier B.

In FIG. 1 and subsequent figures:

carrier B's monitor is at site b;

notation {x x'} denotes the end points of carrier X;

notation {x'|y} denotes the demarcation between adjacent carriers X and Y; and notation {x y'} denotes endpoints of connections through carriers X and Y.

Figure 2:
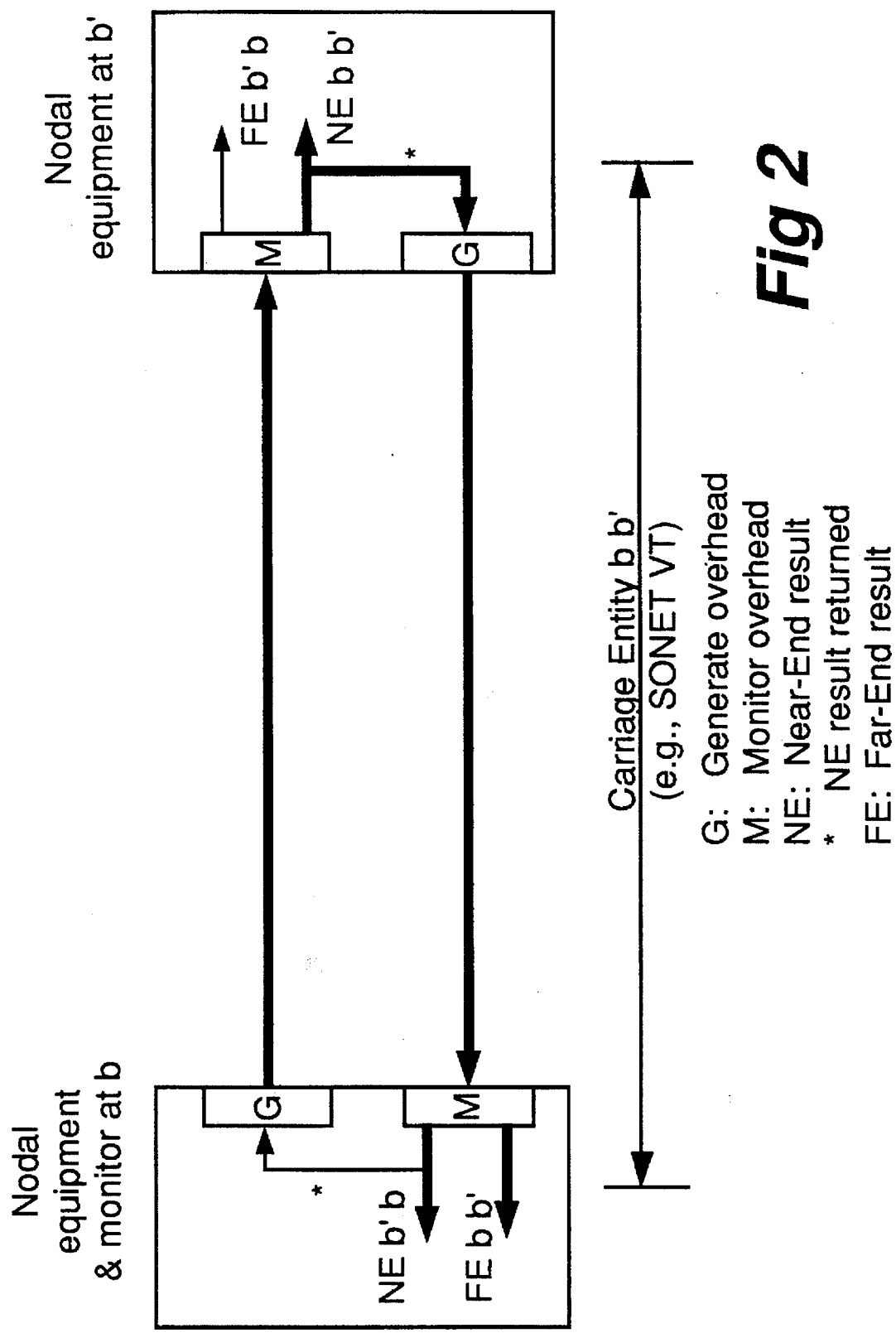
FIG. 2 is a schematic illustration of the NE and FE monitoring functions.
Figure 3:
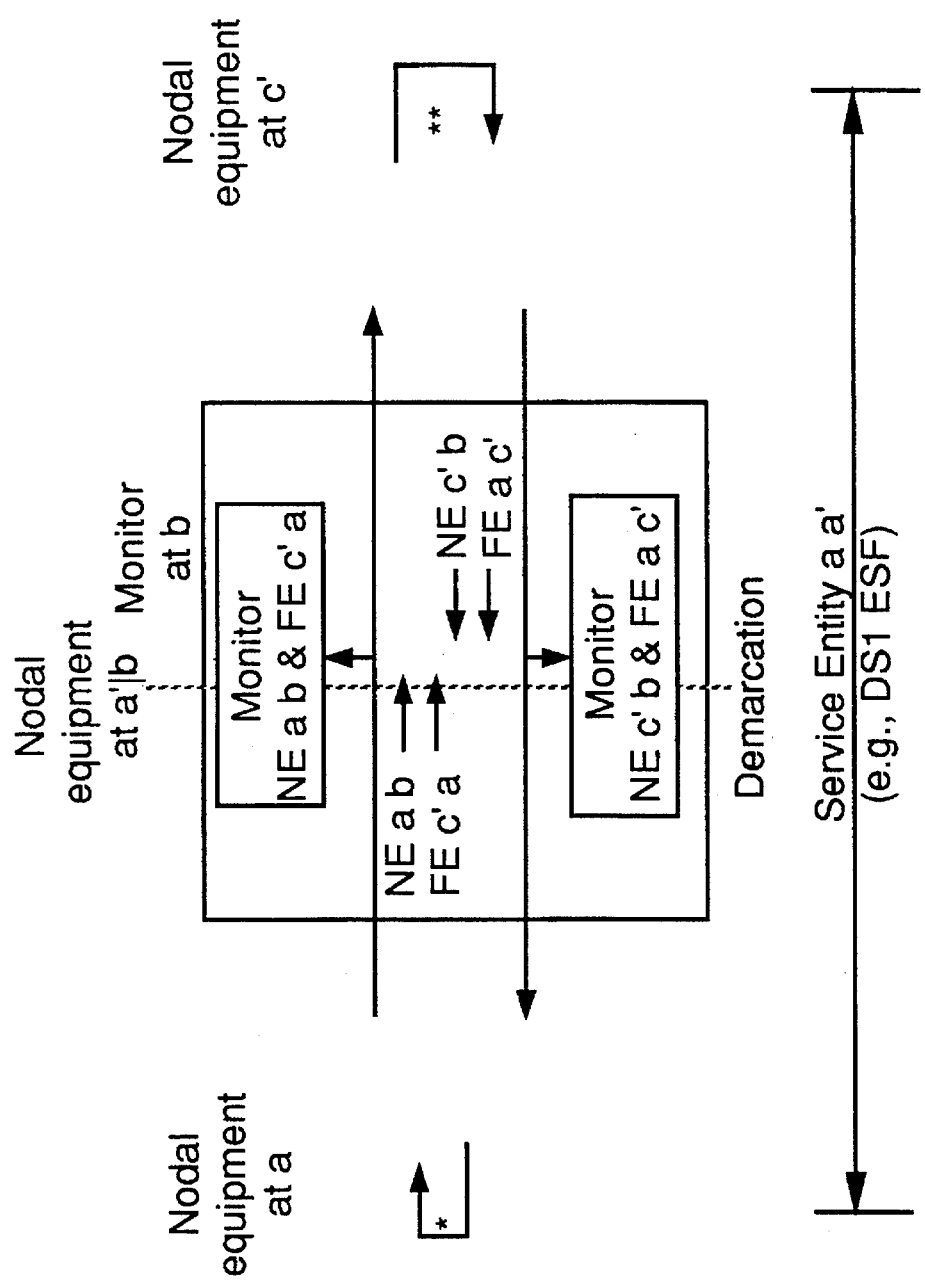
FIG. 3 is a schematic illustration of the Intermediate monitoring function.

Referring to FIGS. 2 and 3, NE, FE and Int. monitorings are defined in this specification as follows:

NE: monitoring a received signal from its origination to its termination;

FE: monitoring a transmitted signal from its origination to its termination, where the result at the far-end termination is returned to the monitoring point in the received signal as FE overhead; and Int.: monitoring a received signal from its origination to the monitoring point (by reading NE overhead at the monitoring point), and monitoring a transmitted signal from its origination to its termination (by reading FE overhead at the monitoring point).

In the environment shown in FIG. 1 involving Carriers A, B and C, the operation of the process according to one embodiment of the invention from the standpoint of carrier B can be summarized as follows:

(a) Carrier B first uses Int. monitoring to detect trouble and its direction on the end-to-end service entity spanning carriers A, B and C. The signal used for this could be e.g., a DS1 ESF signal (digital signal 1st level, extended superframe format; path signal).

(b) Carrier B then uses NE and FE monitoring of a carriage entity spanning only carrier B. The signal used for this could be e.g., a SONET VT (synchronous optical network virtual tributary; path signal).

(c) From Int. monitoring of the service entity, and NE and FE monitoring of the carriage entity, carrier B determines in which carrier the trouble originates. Accordingly, carrier B repairs its network, and/or notifies carriers A and/or C to repair their networks. Layered monitoring further sectionalizes and locates trouble within each carrier, and may use the process described here.

Referring to FIGS. 4a–4e, the operation of the single site monitoring process according to one embodiment is described in detail below, all the monitoring being at site b in carrier B.

Figure 4A:
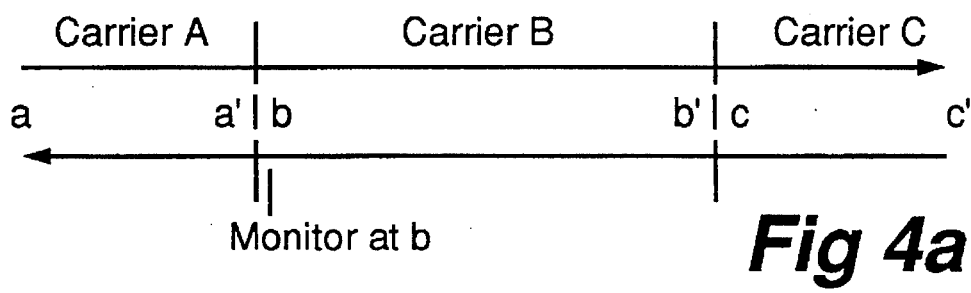
FIGS. 4a–4e show schematically the operation of the process performed according to one embodiment of the invention.

(i) In FIG. 4a, DS1 ESF FE monitoring in transmit and receive directions detects end-to-end trouble in each direction (a to c', and c' to a).

Figure 4B:
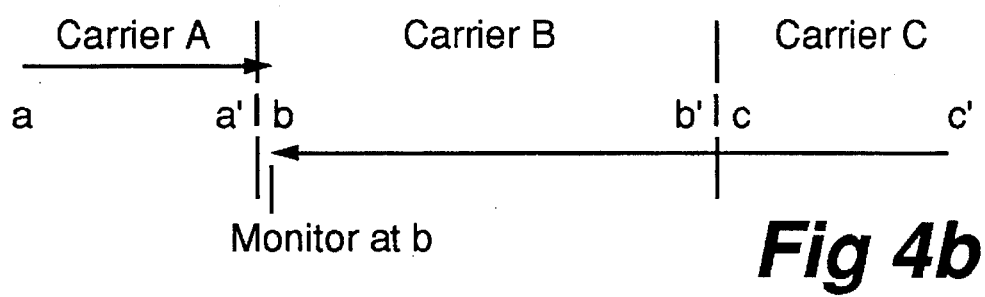

(ii) In FIG. 4b, DS1 ESF NE monitoring in transmit and receive directions sectionalizes trouble from each end-point to the monitor at site b (carrier A a to b, and c' to b).

Figure 4C:
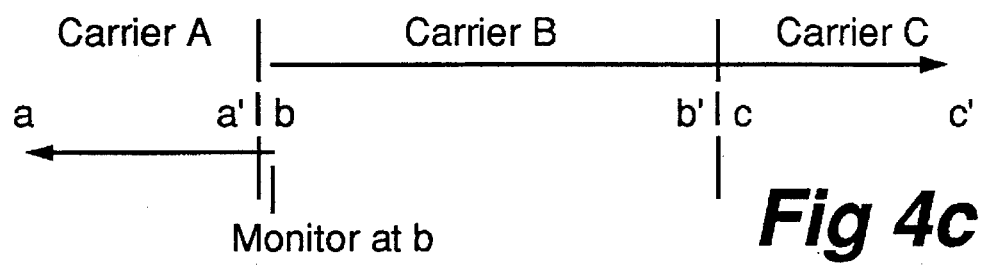

(iii) In FIG. 4c, from (i) and (ii) above, trouble is sectionalized from the monitor at site b to each end-point (b to c', and carrier A b to a).

Figure 4D:
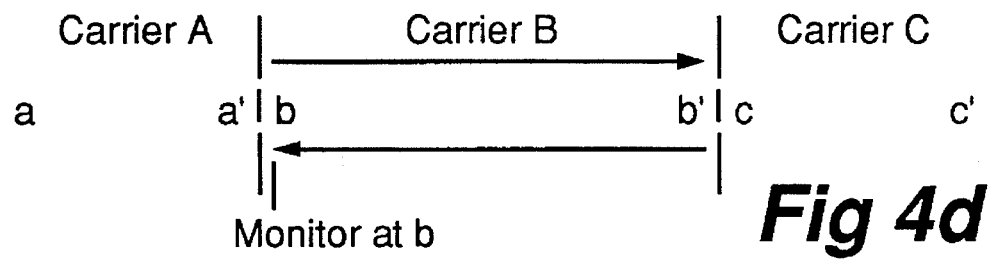

(iv) In FIG. 4d, VT NE and FE monitoring sectionalizes trouble to carrier B (b to b', and b' to b).

Figure 4E:
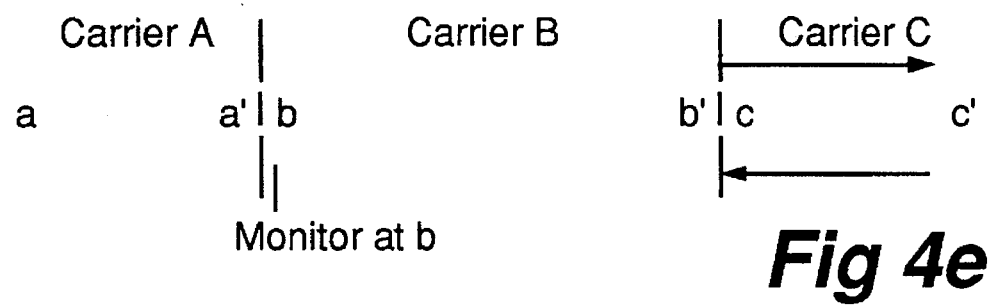

(v) Finally, in FIG. 4e from (ii), (iii) and (iv) above, trouble is sectionalized to carrier C (c to c', and c' to c).

It should be noted that there is a possibility of nodal equipment trouble at demarcations (e.g., trouble at a'|b and/or at b |a'). The monitor at b includes such trouble in steps (i) and (ii), and this trouble is also detected by internal nodal equipment capabilities at a'|b, b|a' for fault location purposes (e.g., equipment failure indications). Similarly, there is a possibility of equipment trouble at demarcation b'|c and/or at c|b'. The monitor at b may or may not include such trouble in step (iv), but this trouble is detected by the equipment at b'|c, c|b'.

The operation is illustrated in FIGS. 4a–4e for the example of a DS1 ESF service entity in a SONET VT carriage entity, but many other combinations are possible, e.g.:

DS1 ESF in DS3 C (digital signal 3rd level, C-bit format; path signal);

SONET VT in SONET STS (synchronous transport (path) signal);

DS3 C in SONET STS;

SONET STS-Nc (Nth level concatenated path signal) in SONET STS-Nt (Nth level tandem path signal);

SONET STS-Nc in SONET STS-N (Nth level line signal);

ATM VC (virtual channel) in ATM VP (virtual path); etc.

Figure 5:
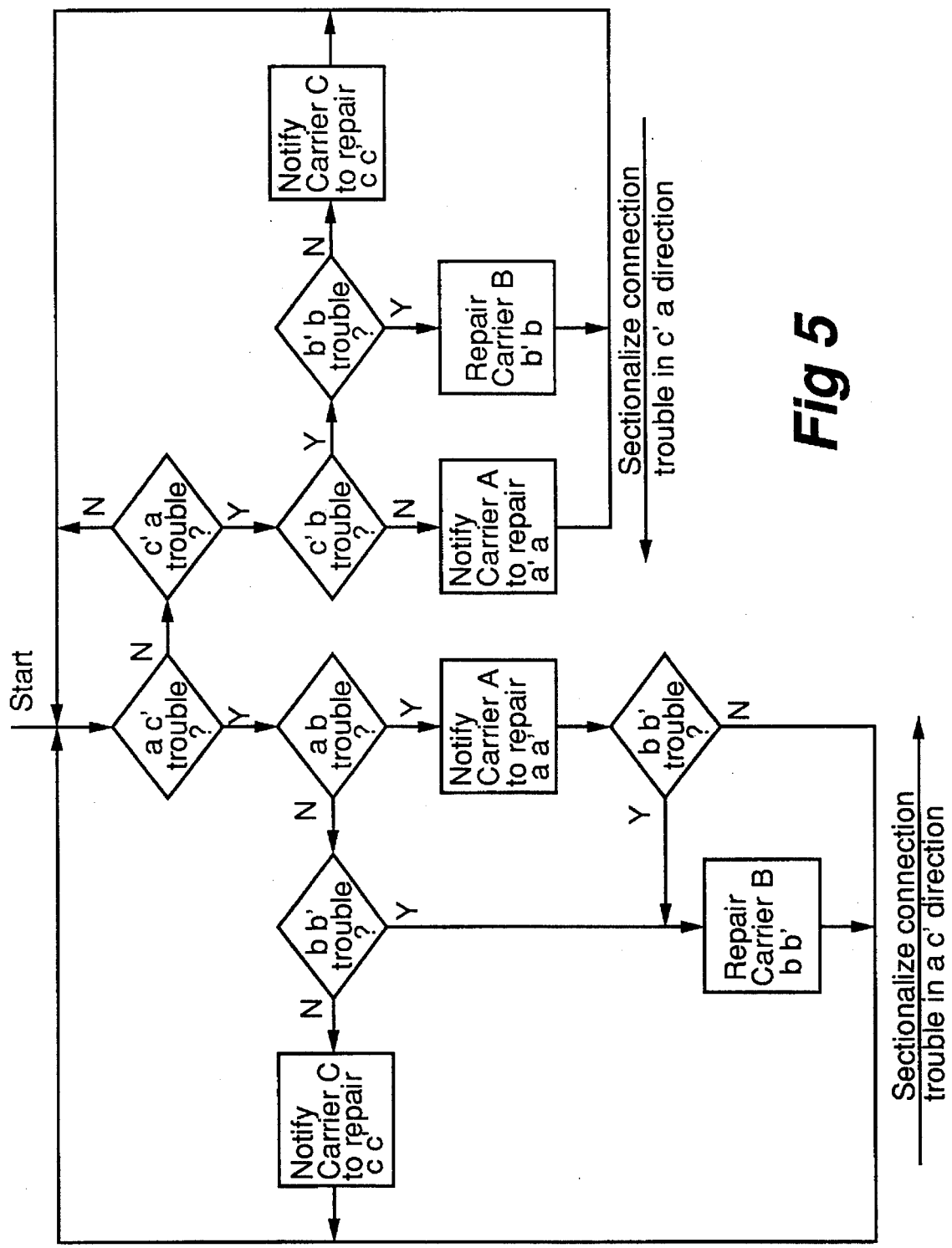
FIG. 5 is a flow chart of the invention according to one embodiment.

FIG. 5 illustrates the general process for trouble sectionalization among three carriers A, B and C, from the standpoint of carrier B. The process may be executed on-demand (e.g., in response to a specific event), or periodically (e.g., every 15 minutes).

In the unlikely event of simultaneous troubles on carriers A and C, or on all carriers, the process sectionalizes carrier A and/or carrier B troubles in the first pass (A and B are next to the monitor at site b), and sectionalizes carrier C trouble on a subsequent pass as soon as carriers A or B are repaired (C is remote from the monitor at site b).

The value of the process is that it can be automated and administered from a single site. This enables rapid, low cost trouble detection, resolution of responsibility for trouble, and responsive corrective action. The trouble sectionalization process can be implemented in surveillance OSs (operation (support) systems), network managers, or element managers, depending on the desired scope of trouble sectionalization.

What is claimed is:

1. In a telecommunication system consisting of a plurality of separately layered networks and/or hierarchically separate networks, a method of sectionalizing trouble on a connection spanning two or three administrative domains within the layered or hiercarchically separate networks, comprising steps of:

(a) at a site located on the connection but adjacent to the boundary of two administrative domains, conducting FE monitoring for trouble in two directions along the connection;

(b) at the site, conducting NE monitoring for trouble in the two directions;

(c) at the site, conducting NE and FE monitoring for trouble in the domain in which the site is located; and (d) sectionalizing trouble to any of the administrative domains according to the monitoring results.

2. The method of sectionalizing trouble on a connection spanning two or three administrative domains according to claim 1 wherein the connection is maintained with a plurality of entities, each of which uses its own monitoring signals.

3. The method of sectionalizing trouble on a connection spanning two or three administrative domains according to claim 2 wherein the administrative domains are LECs and IECs, and the connection is maintained with a service entity and carriage entity.

4. The method of sectionalizing trouble on a connection spanning two or three administrative domains according to claim 3 wherein the connection involves an IEC and two LECs, the carriage entity spans only the IEC and the service entity spans the connection from end-to-end.

5. The method of sectionalizing trouble on a connection spanning two or three administrative domains according to claim 4 wherein the carriage entity uses SONET monitoring signals, and the service entity uses DS1 ESF signals.

6. The method of sectionalizing trouble on a connection spanning two or three administrative domains according to claim 1 wherein the steps are performed on an on-demand basis or on a pre-set periodic basis.

\* \* \* \* \*